United States Patent Office 3,518,147
Patented June 30, 1970

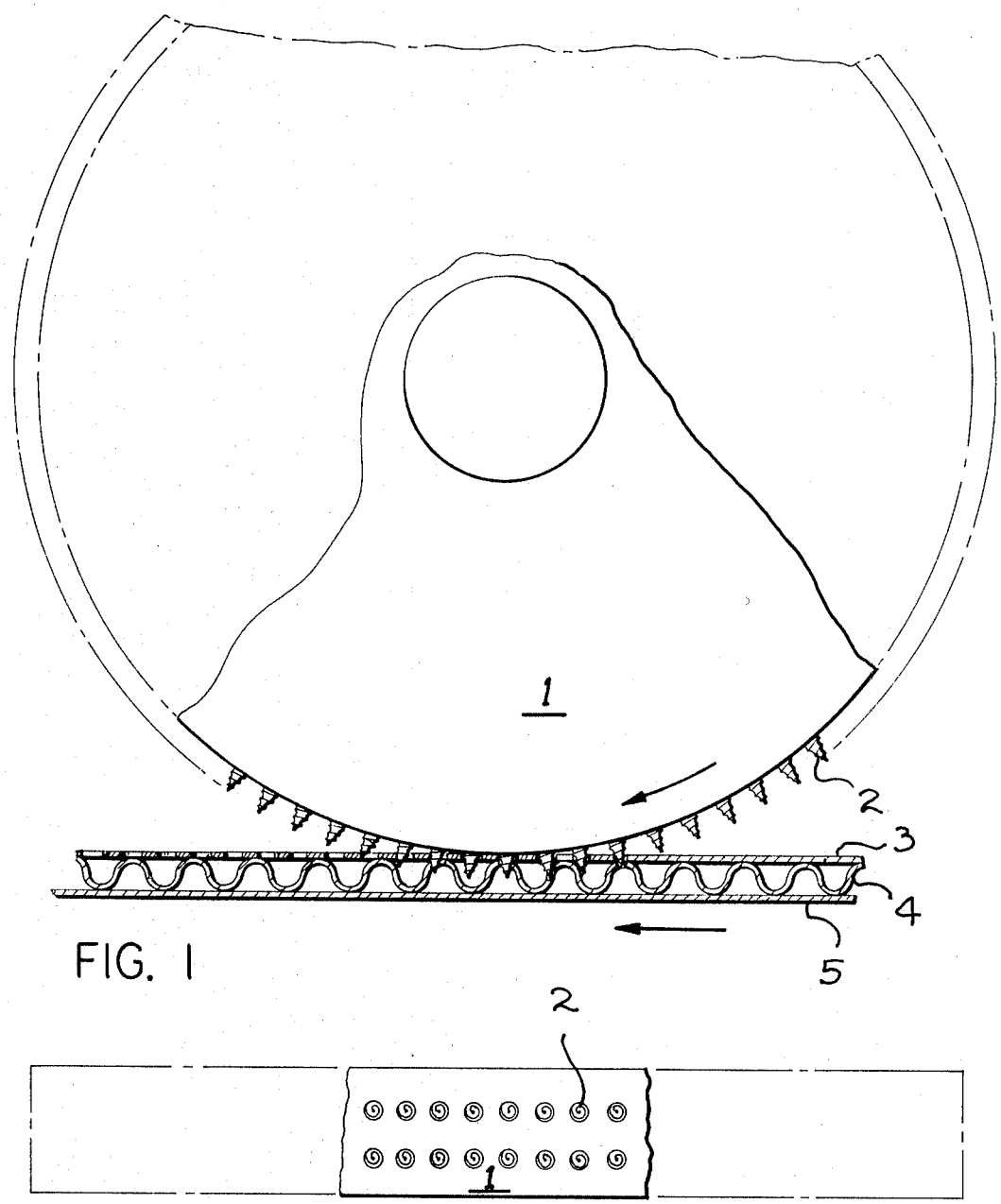

3,518,147
PROCESS AND APPARATUS FOR MANUFACTURE OF NOVEL JOINT
John H. Harmsen, Streator, Ill., assignor to Owens-Illinois, Inc., a corporation of Ohio
Filed Jan. 4, 1967, Ser. No. 607,291
Int. Cl. B32b 31/18
U.S. Cl. 156—252                 10 Claims

ABSTRACT OF THE DISCLOSURE

This invention comprises joining together two or more layers of corrugated paperboard by perforating the surface of at least one layer and providing a multiplicity of apertures therein by means of a series of elongated elements, each of said elements having a coarse and uneven surface so as to remove perforated material from each aperture upon withdrawal of each element. An adhesive bonding agent is then applied to at least one layer in an amount sufficient to at least partially fill a portion of the apertures when the adhesive-containing, perforated or non-perforated layer is overlapped and contacted with the perforated or non-perforated surface of another layer. The two surfaces are maintained in direct contact position by an applied force until the agent has set sufficiently to join the surfaces of the overlapped layers.

DISCLOSURE OF INVENTION

This invention relates to a novel process and novel apparatus for joining together at least two sheets of corrugated paperboard.

More particularly, this invention relates to a novel process and apparatus for manufacturing a novel and useful construction comprising at least two overlapped layers of corrugated paperboard held together by a joint having improved strength in tension.

In the manufacture of articles from laminated or composite materials such as paperboard or pressed fiberboard, wherein a joint is formed by securing portions of overlapped layers of the material to one another by means of an adhesive bonding agent, it has been noted that such joints fail in tension at a value considerably under the shear strengths of the typically used adhesive bonding materials and considerably under the theoretical tensile strength of the individual layers of laminated or composite material.

Such is particularly true of articles formed from relatively stiff layers of paperboard of a type which is formed on a Fourdrinier papermaking machine, such as linerboard formed from pulp made by the Kraft or competitive processes.

Based on examinations and observations of lapped paperboard and fiberboard joints which have failed in tension at a relatively low value, it is believed such failures are caused by delamination or separation of a given layer of paperboard or fiberboard into a number of thin discrete overlying sub-sheets which are free to move with respect to one another; that is, the effective thickness of a sheet of paperboard to resist tension applied only at the face of the sheet is considerably less than the total thickness of the sheet. This delaminating characteristic of the types of paperboard (widely used because of superior structural properties, for example, in the so-called composite or fiber cylindrical containers) is even more pronounced when the loaded portion of the fiberboard is exposed to water or to a high humidity environment.

In the practice of the instant invention, it has been discovered that the relative strength of the resulting joint(s) between two given layers of corrugated paperboard is substantially increased if the apertures in a perforated surface are relatively free of perforated material prior to the application of an adhesive bonding agent.

More particularly, in accordance with this invention there is provided a process for joining one layer of corrugated paperboard to another layer of corrugated paperboard which comprises perforating the surface of at least one layer so as to produce a multiplicity of apertures therein, each aperture having a depth less than the thickness of the layer, simultaneously removing perforated material from each aperture, overlapping each perforated layer with another layer, and providing between the overlapped layers an adhesive bonding agent in an amount sufficient to at least partially fill a portion of the apertures so as to join the layers together.

In the further practice of this invention, there is also provided novel apparatus for joining one layer of corrugated paperboard to another layer of corrugated paperboard, which comprises, in combination, a series of elongated perforating elements adapted to protrude into the surface of at least one layer and form a multiplicity of apertures therein, the surface of each element being sufficiently coarse and uneven so as to remove perforated material from each aperture upon withdrawal of each element from the layer, means for applying an adhesive bonding agent to the surface of at least one of the layers to be joined, and means for overlapping and compressing the layers together.

For a further description of this invention, attention is directed to the drawing and the discussion thereof.

THE DRAWING

FIG. 1 is a view of one embodiment of this invention for perforating a selected material, e.g. corrugated paperboard.

FIG. 2 is a fragmentary plan view of the paperboard in the process of being perforated in accordance with the embodiment of FIG. 1.

More particularly, there is illustrated in FIGS. 1 and 2 a cylindrical body or drum 1 having a series of perforating elements 2 radially mounted along the circumferential surface of the body. These can be mounted by any suitable means such as welding or bonding with an organic-base substance.

As is further illustrated in FIG. 1, a layer of corrugated paperboard comprised of paper layers 3, 4, and 5 is contacted and perforated by a portion of the elements 2.

In the typical commercial embodiment, the body 1 is rotated (e.g. by any conventional means such as a motor, belt, and pulley) while the corrugated paperboard is moved at a uniform rate. As indicated by the arrows in FIG. 1, the body 1 and corrugated paperboard are moved such that the direction of each is instantaneously the same at the point of contact; that is, both the body 1 and paperboard layer move together rather than against the other.

Although not shown in the drawing, the paperboard layer may be moved by any suitable means such as a conventional conveyor belt. In a box folding process, the layer may be fed onto the belt from a suction feed hopper.

Likewise, the adhesive bonding agent may be applied by any conventional means such as a roller or brush.

The overlapping and contacting of the corrugated paperboard layers may be done by a conventional box folding or box making machine.

DETAILED EMBODIMENTS AND DESCRIPTION

In accordance with this invention, each perforating element may comprise any elongated, relatively sharppointed structure having a relatively coarse and uneven surface.

As used herein a coarse and/or uneven surface is defined as including any irregular surface which is sufficient to pull, carry, or otherwise remove excess perforated material from the aperture upon withdrawal of the element from the aperture.

Thus, the surface may be serrated, broached, ridged, grooved, bumpy, roughened, and/or notched.

In a specific embodiment, it is contemplated using an element having a helical surface, e.g. such as a screw as described hereinbefore in the discussion of FIGS. 1 and 2.

The perforating elements may be mounted in any suitable surface such as a flat surface which may be pressed or otherwise moved in contact with the surface of the corrugated paperboard.

The elements may also be mounted in other type surfaces such as circular, rotating, surface, e.g. as illustrated in FIGS. 1 and 2. Likewise, any suitable means may be used to fasten the elements to the surface.

The spacing and number of elements will depend to a large extent upon the width and length of the corrugated paperboard layer. Thus, the greater the surface area of the layer, the more apertures (and elements) which will be required for sufficient strength.

In one embodiment, a groove, e.g. about one inch wide and $5/16$ of an inch deep, is cut into a circumferential surface (as illustrated in FIG. 1) and filled with a plastic mastic, e.g. about $1/16$ of an inch thick. A series of screw heads are then mounted in the groove such that the pointed ends protrude radially outward from the groove. The screw heads are then coated with plastic mastic which is allowed to dry and set for a suitable period of time, e.g. about 36 hours.

It is also contemplated herein that the perforating elements may be positioned in a series of rows. In one embodiment, it has been found suitable to position the elements in rows about $5/8$ of an inch apart center to center.

Typically, the perforation of the layer(s) and the application of the adhesive agent are done separately. Thus, when using the perforating apparatus of FIG. 1, the adhesive may be applied to the first paperboard layer subsequent to the perforation thereof or the agent may be applied to the other perforated or non-perforated layer which is to be joined to the first layer.

The selected adhesive bonding agents contemplated herein include both hot and cold setting materials.

Typical hot setting materials include thermoplastics such as polyethylene, polystyrene, or polyvinyl chloride. It is well understood in the art that such thermoplastic materials may be applied, e.g. to one of the overlapping layer portions, while the material is in a heated, tacky condition, as by extrusion. The thermoplastic material subsequently cools and hardens thereby bonding the layers together.

Additional hot setting materials include thermosetting resins such as urea formaldehyde, ketone aldehyde, melamine, phenolics, and polyurethane.

Typical cold setting materials include polyvinyl acetate, polyvinyl alcohol, acrylic resins, and silicates such as sodium silicate.

I claim:

1. A process for joining one layer of corrugated paperboard to another layer of corrugated paperboard which comprises perforating the surface of at least one layer so as to produce a multiplicity of apertures having a depth less than the thickness of the layer, simultaneously removing perforated material from each aperture, overlapping each perforated layer with another layer, and providing between the overlapped layers an adhesive bonding agent in an amount sufficient to at least partially fill a portion of the apertures so as to join the layers together.

2. The process of claim 1 wherein the adhesive bonding agent is a cold setting material.

3. The process of claim 2 wherein the cold setting material is selected from polyvinyl acetate, polyvinyl alcohol, acrylic resin, and inorganic silicate.

4. The process of claim 1 wherein the adhesive bonding agent is a hot setting material.

5. The process of claim 4 wherein the hot setting material is selected from thermosetting and thermoplastic resins.

6. Apparatus for joining one layer of corrugated paperboard to another layer of corrugated paperboard which comprises, in combination, a series of elongated perforating elements adapted to protrude into the surface of at least one layer and form a multiplicity of apertures therein, the surface of each element being sufficiently coarse and uneven so as to remove perforated material from each aperture upon withdrawal of each element from the layer, means for applying an adhesive bonding agent to the surface of at least one of the layers to be joined, said agent being applied in an amount sufficient to at least partially fill a portion of the apertures in the perforated layer upon compression of the layers together, and means for overlapping and compressing the layers together.

7. The apparatus of claim 6 wherein the length of each perforating element is less than the thickness of the layer.

8. The apparatus of claim 7 wherein each perforating element has a helical surface.

9. Apparatus for joining one layer of corrugated paperboard to another layer of corrugated paperboard which comprises, in combination, means for conveying at least one layer along a predetermined path, a series of elongated perforating elements at a first position along the path, each of said elements having a helical surface adapted to form a multiplicity of apertures in the surface of the layer, means for applying an adhesive bonding agent to the perforated surface at a second position subsequent to the first position, and means for overlapping and compressing the perforated and adhesive containing surface of the layer with the surface of another layer.

10. The apparatus of claim 9 wherein the perforating elements comprise a series of screws, the head of each screw being mounted along the circumferential surface of a cylindrical body such that each screw radially protrudes from said surface, and means for rotating the cylindrical body such that the screws continuously perforate the layer as it is conveyed to said first position.

References Cited

UNITED STATES PATENTS

| 2,020,639 | 11/1935 | Grayson et al. | 161—137 X |
| 2,405,527 | 8/1946 | Skolnik | 156—182 X |
| 2,566,738 | 9/1951 | Mitchell | 83—660 X |
| 2,983,636 | 5/1961 | Runton | 156—252 X |
| 3,031,960 | 5/1962 | Bishop | 156—252 X |
| 3,132,985 | 5/1964 | Moore | 156—513 X |

VERLIN R. PENDEGRASS, Primary Examiner

U.S. Cl. X.R.

83—660; 156—513